United States Patent [19]

Stone

[11] 4,027,464
[45] June 7, 1977

[54] COTTON HARVESTING MACHINE

[75] Inventor: G W (Charles) Stone, Dyess, Ark.

[73] Assignee: Agriculture Research Incorporated, Williamsburg, Va.

[22] Filed: June 21, 1976

[21] Appl. No.: 698,275

Related U.S. Application Data

[63] Continuation-in-part of Ser. No. 581,696, May 28, 1975, Pat. No. 3,964,242.

[52] U.S. Cl. .................................... 56/30; 56/13.3; 302/17
[51] Int. Cl.² ........................................ A01D 46/10
[58] Field of Search ............... 56/30, 28, 12.8–13.3, 56/334, 336, 340; 193/7; 302/17, 49, 51

[56] References Cited

UNITED STATES PATENTS

| | | | |
|---|---|---|---|
| 564,881 | 7/1896 | Gould | 56/340 |
| 1,731,826 | 10/1929 | Morara | 56/44 |
| 2,140,399 | 12/1938 | Connolly | 56/30 |
| 2,175,216 | 10/1939 | Rust | 56/13.1 |
| 2,241,423 | 5/1941 | Rust | 56/13.2 |
| 2,660,848 | 12/1953 | Rust | 56/30 |
| 2,763,978 | 9/1956 | Graham et al. | 56/30 |
| 3,332,220 | 7/1967 | Lofgreen | 56/30 |
| 3,555,794 | 1/1971 | Gable, Jr. et al. | 56/30 |

*Primary Examiner*—Russell R. Kinsey
*Attorney, Agent, or Firm*—Littlepage, Quaintance, Murphy, Richardson & Webner

[57] ABSTRACT

An apparatus adapted to be used in conjunction with a conventional cotton harvester for gleaning cotton missed by the harvester consists of a pair of independently suspended, parallel, opposed intake manifolds. Each manifold comprises a floor member having frontward and rearward end wall members fixed at opposite ends of the floor member. An outside wall is fixed to an outside edge of the floor member and extends from the frontward end wall to the rearward end wall. An inside wall having a height significantly less than the outside wall is fixed to the floor member parallel to, but some distance from, the running edge of the floor member. A downfall sheet is fixed to a top edge of the outside wall and to the inside wall so as to be spaced from and inclined with respect to the floor member. The inside wall contains a plurality of apertures leading to forwardly- and upwardly-inclined ducts leading to the flue comprising the inside of the manifold. A plurality of longitudinal slots in the downfall sheet overlie the forwardly- and upwardly-inclined ducts. Appropriate conduits, blowers, etc. can be connected to each intake manifold via an opening in the rearward end wall of the manifold. Cotton collected by the intake manifolds is pneumatically and mechanically transferred to a header portion of the cotton harvester for further treatment in a conventional manner.

12 Claims, 8 Drawing Figures

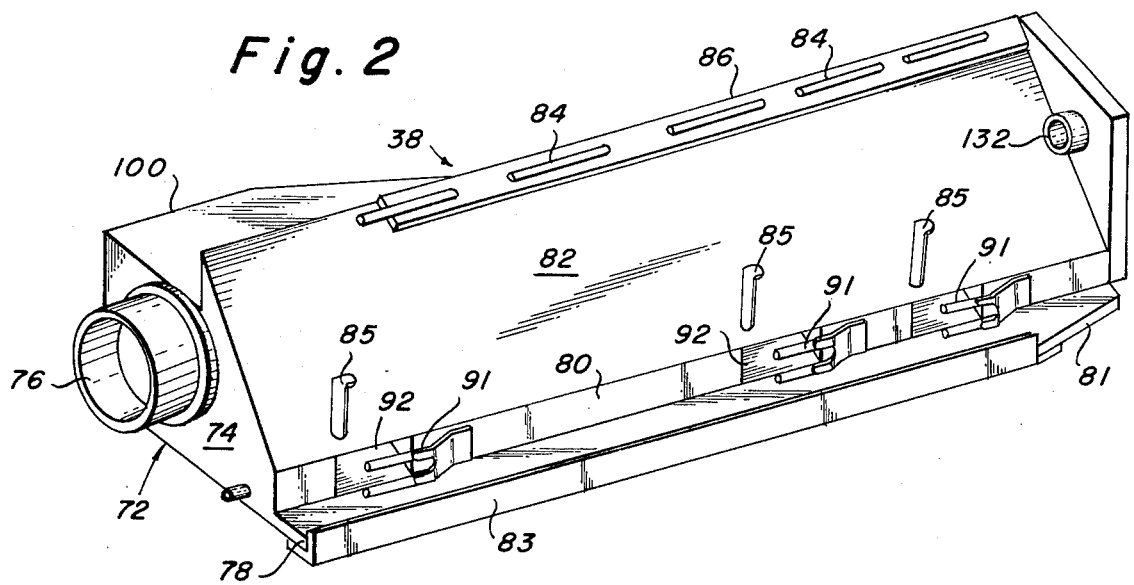
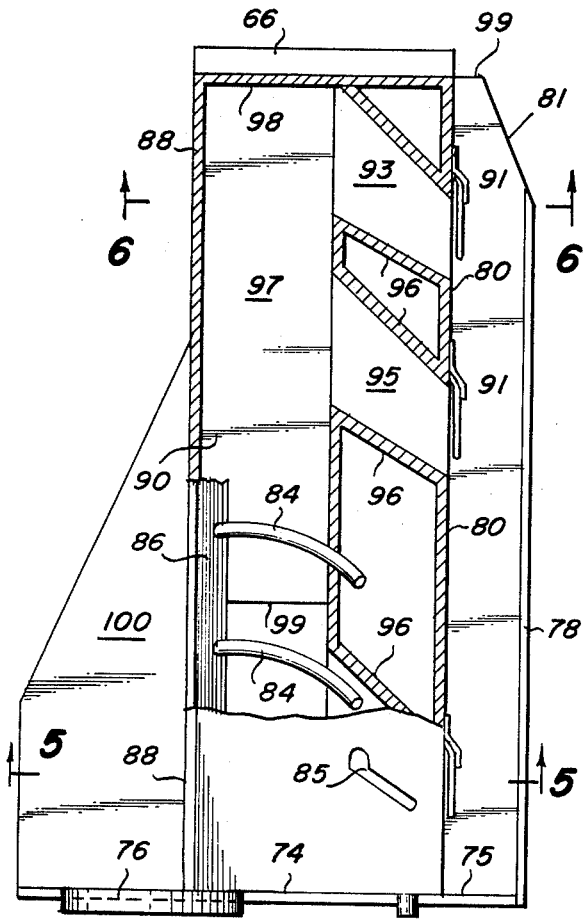
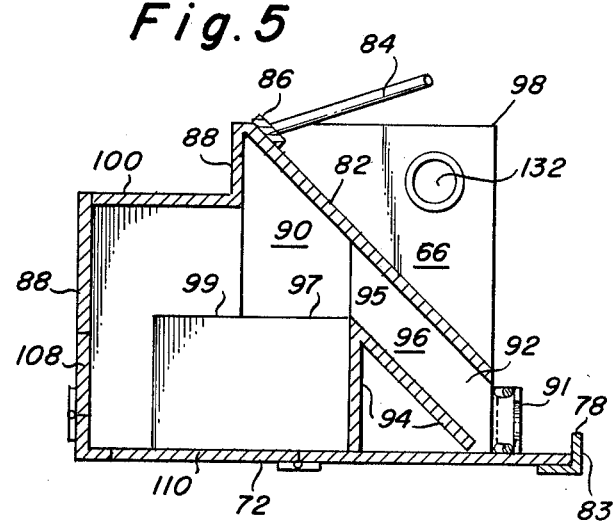
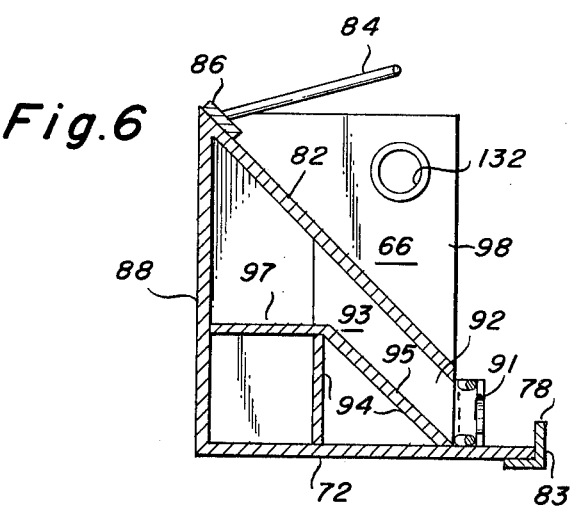

COTTON HARVESTING MACHINE

CROSS-REFERENCES TO RELATED APPLICATIONS

This application is a continuation-in-part of an earlier application Ser. No. 581,696 now U.S. Pat. No. 3,964,242 filed May 28, 1975 of the same title and having the same inventor.

BACKGROUND OF THE INVENTION

1. Field of the Invention

This invention pertains generally to pneumatic cotton harvesters, and particularly to an apparatus of that type used in combination with a rotary or oscillating spindle type cotton picker.

2. Description of the Prior Art

The use of modern mechanized harvesting equipment for harvesting cotton results in valuable quantities of cotton being scattered on the ground and intermixed with leaves, grass, weeds and dirt. Reportedly as much as 20% of a cotton crop is commonly lost in this manner following the passage of the mechanical harvesting equipment.

Various proposals have been made for recovering this fallen cotton, but all are found subject to serious disadvantages and shortcomings sought to be avoided by the present invention. Examples of prior art devices using at least in part pneumatic means for recovering the cotton are to be found in U.S. Pat. Nos. 2,674,078, 3,308,581, 3,327,459, 3,332,220 and 3,416,296.

The recovery of the cotton is complicated by various factors including the fact that cotton is light and its fibers very easily become entangled with other portions of the cotton plant and with other plants. This is particularly serious as respect to leaves and other foreign material of a dry nature which remains attached to the cotton.

To be effective, therefore, it is important, therefore, that the recovery equipment be so designed as to be capable of recovering cotton with a minimum quantity of dirt, leaves, and other debris with which it may be initially engaged. Further, that portion of the debris and foreign matter entering the apparatus must then be separated and ejected from the apparatus without risk of losing the recovered cotton.

The equipment heretofore proposed for the purpose just referred to has been quite unsatisfactory and subject to serious shortcomings, including ineffectiveness in recovering cotton and incapability to clean and separate foreign matter to acceptable minimum standards. As a consequence, the recovered cotton carries highly objectionable quantities of foreign matter with it and this causes serious damage to ginning equipment through which all cotton is passed when first received from the grower.

Much of the prior art is centered at retrieving cotton which has already fallen on the ground. Most schemes of this type incorporate an unsatisfactorily large amount of foreign matter in the recovery process rendering the cotton unacceptable for further use. It is therefore an object of this invention to recover cotton which would normally fall on the ground as the mechanical harvesting equipment is passing through the field before the cotton has a chance to actually hit the ground. A further object of the invention is to provide means for separating out leaves, stalks, rocks, dirt clods, and other debris while retaining only substantially clean cotton.

Another object of the invention is to provide means by which the cotton which would otherwise have been lost will be retrieved and transferred to the picking and cleaning mechanisms included as usual standard features in a cotton harvester. During the transfer process, a second cleaning function is included to further eliminate green bolls, dried leaves, stems, and other trash from the valuable cotton.

It is well recognized that while rotating or oscillating spindle-type harvesters are able to successfully pick a major portion of the cotton from the cotton plant, some of the cotton is loosened but not removed from the plant. As the plant then leaves the picker header of the harvesting machine, the previously unremoved cotton is dislodged and falls to the ground. It is therefore an object of this invention to position a means for gleaning this cotton immediately behind the cotton picker header and provide the gleaning means with means for agitating the stalks and branches of the cotton plants to complete the dislodging and removing of this cotton from the cotton plant. The dislodged cotton is captured before it has an opportunity to hit the ground, thus preventing the quality degradation of the cotton experienced by so many prior art devices of this type.

SUMMARY OF THE INVENTION

An apparatus adapted to be used in conjunction with a conventional cotton harvester for gleaning cotton missed by the harvester consists of a pair of independently suspended, parallel, opposed intake manifolds. The manifolds are suspended immediately behind the cotton picker header, one on each side of the plant exit slot of the header. The cotton plant upon exitting from the cotton picker header travels between the two intake manifolds and is subjected to violent shaking of the stalk and branches to encourage the complete dislodging of any remaining cotton on the plant. The dislodged cotton falls to a generally V-shaped trough formed by the two manifolds, one on each side of the cotton plant. The cotton gravitates to the lowest portion of the V and is pneumatically swept through ducts to the interior of the manifold and then pneumatically and mechanically is transferred back to the picker header portion of the cotton harvester for treatment in a conventional manner. The sheets forming the V-shaped trough preferably includes a plurality of longitudinal slots, each slot communicating with the upwardly- and forwardly-inclined ducts to improve the ingesting process of the manifolds. The width of each slot is preferably less than the diameter of the average green boll to prevent their entry into the manifold.

Each manifold of the gleaner comprises a floor member having a frontward and rearward end wall members fixed at opposite ends thereof. An outside wall is fixed to an outside edge of the floor member and extends from the frontward end wall to the rearward end wall. An inside wall having a height significantly less than the outside wall is fixed to the floor member parallel to, but some distance from, the running edge of the floor member. The running edge of the floor member is that edge immediately adjacent to the stalk of the cotton plant as it passes between the two manifolds. A downfall sheet is fixed to a top edge of the outside wall and to the inside wall so as to be spaced from and inclined with respect to floor member, the downfall sheets of the pair of manifolds thus forming a generally V-shaped trough.

The inside wall contains a plurality of apertures leading to forwardly and upwardly inclined ducts leading to the flue comprising the inside of the manifold. The flue can include a second floor positioned at same height as the bottom of the flue end of the ducts and extending from the frontward end wall a major portion of the distance toward the rearward end wall. The second floor preferably terminates step wise to form a draft velocity change area which function to trap large green bolls which can be periodically removed from the manifold through a closured opening.

The ducts are preferably diverging ducts which are smaller at the aperture end than at the flue end of the ducts. At a forward side of each duct, the downfall sheet is narrowly slotted to permit the direct entry of lint cotton into the duct. A forked boll guard extends from a forward side and across substantially all of each aperture to prevent green, unripe cotton bolls from entering the ducts.

The cotton gleaning apparatus further consists of blower means mounted on the cotton harvester and flexible conduits attached to the openings in the rearward end walls of each manifold and to the blower means for withdrawing the cotton collected by the intake manifolds. The cotton is then directed through a conveyor means attached to the blower means for conveying the cotton collected to the cotton picker header of the cotton harvester. The conveyor means preferably includes a debris eliminator comprising a longitudinal open framework, mounting means pivotally mounting the open framework with respect to the cotton harvester, wire screening or the like fixed to the longitudinal open framework to define a passageway through which the cotton can flow, and a vibrating means fixed to the longitudinal framework for vibrating the debris eliminator. The debris eliminator preferably includes a plurality of multi-tined cleaning combs which aid in the elimination of unwanted debris. The cotton, with a significant portion of the unwanted debris eliminated is then returned to the header portion of the cotton harvester and reintroduced into the header treatment in a conventional manner.

The cotton picker header portion of the harvesting machine is preferably equipped with a plant lifter for raising the low branches of the cotton plant into picking position so that the cotton contained on the low branches is not lost. Further, shield members defining a floor inside the header portion of the cotton harvester should be present to preclude cotton falling to the ground while the cotton plant is inside the header portion of the harvesting machine. The shield members preferably continue throughout the length of the header and extend beyond the rear surface of the header and overlap a portion of the floor member of the two intake manifolds so as to direct cotton to a position to be pneumatically retrieved by the cotton gleaner.

BRIEF DESCRIPTION OF THE DRAWINGS

FIG. 2 is a perspective view of a single manifold incorporating the features of this invention.

FIG. 4 is a partial sectional detail of the intake manifold shown in FIG. 2.

FIG. 5 is a sectional view of the manifold shown in FIG. 4 taken along line 5—5.

FIG. 6 is another sectional view of the intake manifold shown in FIG. 4 taken along line 6—6.

DESCRIPTION OF THE PREFERRED EMBODIMENTS

Figure 1:
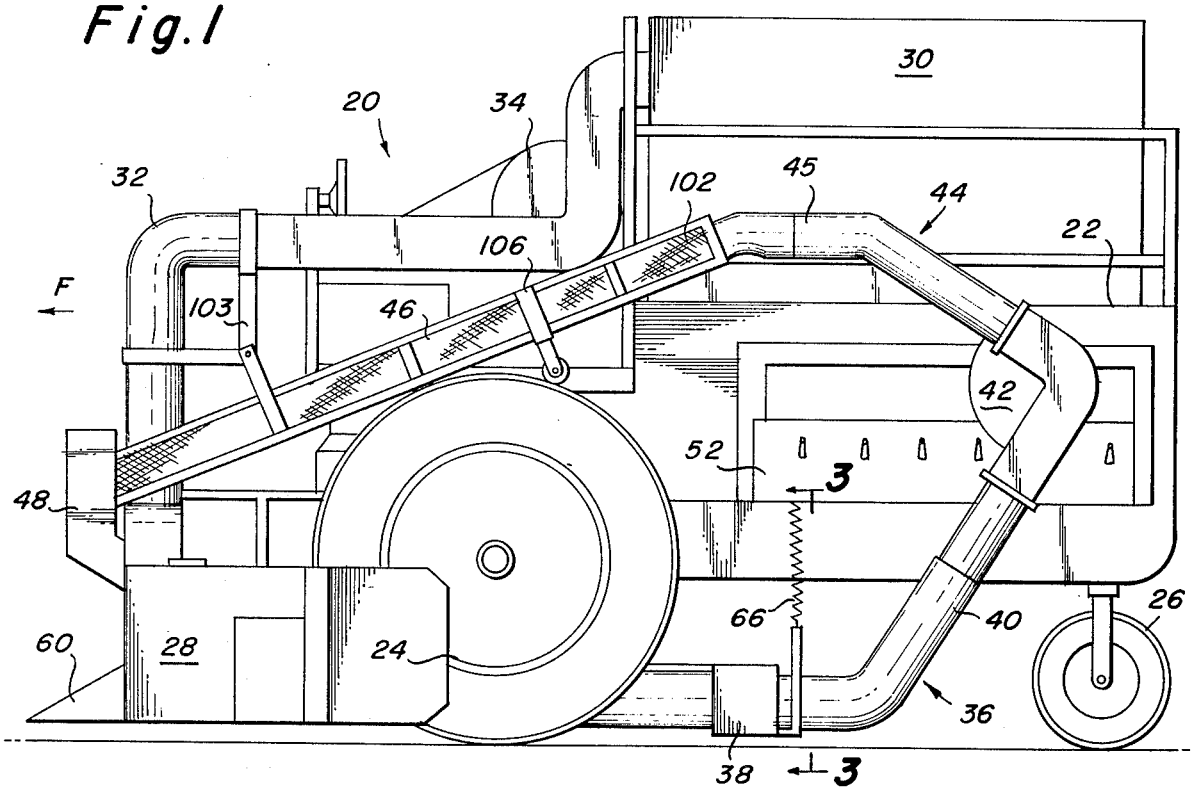
FIG. 1 is a side elevation view of a cotton harvesting machine incorporating a cotton gleaner according to this invention.

A conventional cotton harvester incorporating the improvements of this invention is shown generally in FIG. 1 as 20. The cotton harvester 20 can comprise a self-contained mobile apparatus specifically designed for the function of picking cotton, or can be as illustrated a tractor 22 having traction wheels 24, and steerable wheel 26 with a cotton picker header mounted thereon. The cotton picker header 28 precedes the tractor 22 down rows of cotton plants in the direction indicated by the arrow F. Cotton picked by the header 28 is delivered from the header to a receptacle 30 by a conveyor tube 32 and blower 34. The receptacle or basket 30 is periodically emptied during the picking process, the cotton being then transported to another location for further processing, ginning, and the like. It will be appreciated by those skilled in the art that a pair of picker headers 28 and other associated machiner can be functionally mounted on a single tractor 22 with only slight modification.

The cotton harvester 20 illustrated in FIG. 1 incorporates a cotton gleaner 36 according to this invention. The gleaner 36 comprises intake manifolds 38 which immediately follow the cotton picker header 28 to glean cotton missed by the picker header. Attached to the intake manifolds 38 are flexible conduits 40 and blower means 42 for withdrawing the cotton collected by the intake manifolds 38. The cotton is directed from the blower means 42 to a conveying means 44 for conveying the cotton collected to the cotton picker header 28 of the cotton harvester 20. The conveyor means 44 comprises tubes 45 attached to the blower 42, a debris eliminator 46 and a front delivery chute 48.

Figures 7, 8:
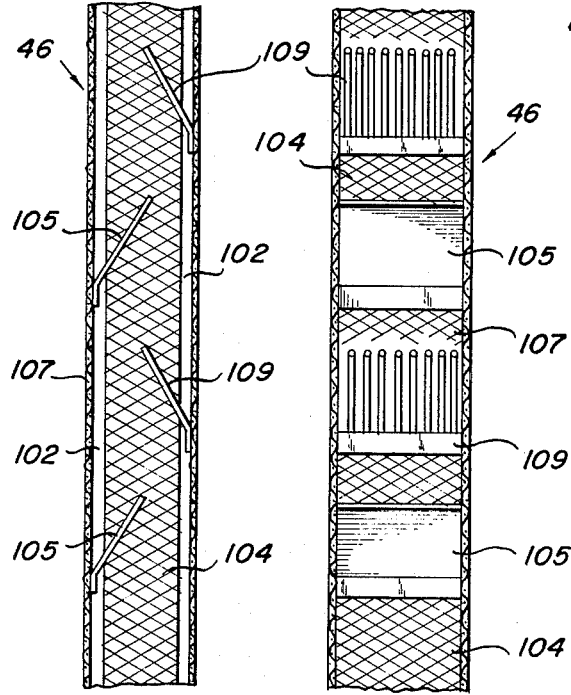
FIG. 7 is a sectional detail of a debris eliminator used in conjunction with the remaining apparatus forming this invention.
FIG. 8 is a sectional detail of the debris eliminator illustrated in FIG. 7 as viewed from the right side of FIG. 7.

The debris eliminator 46 comprises an open longitudinal framework 102 and a mounting means 103 for mounting the open framework with respect to the cotton harvester 20. Fixed to the longitudinal open framework is wire screening 104, defining a passageway through which the cotton gleaned by the cotton gleaner 36 is delivered to the front delivery chute 48. The conveyor means 44 can include a vibrating means 106 for providing the necessary forward motion of the cotton from tubes 45 to the front delivery chute 48. The vibrational motion together with the openings presented in the wire screening 104 tends to sift out dirt, dry leaves, small twigs and other trash as the cotton travels through the debris eliminator 46 toward the header 28. The debris eliminator 46, illustrated in more detail in FIGS. 7 and 8 preferably contains a plurality of forwardly inclined solid sheets 105 fixed to the floor 107 and framework 102 of the debris eliminator 46. The floor 107 is illustrated particularly in FIG. 8 to be made of wire screening 104 but can be solid if desired. The debris eliminator 46 also preferably contains a plurality of forwardly inclined combs 109 depending from the roof 111 and framework 102. The roof 111 is preferably made of wire screening 104. The combs 109 and sheets 105 act to break up clusters of gleaned cotton passing through the debris eliminator thus improving its operation.

During the harvesting process, the cotton picker header 28 travels down rows of cotton plants in the direction indicated by the arrow F. The cotton plants enter a slot in the picker header 28 and picking spindles project into the cotton plant in a manner well known in the art to pick and retrieve the ripe cotton from the cotton plant. The header 28 preferably includes a plant lifter 60 which directs the low-hanging branches of the cotton plant to a higher angle so as to permit more thorough cleaning by the picking spindles. The header 28, when mounted on a tractor 22 as shown in FIG. 1 is generally powered by a power takeoff means (not shown) connected to the main power plant 52. The rear surface 68 of the header 28 is shown in FIG. 3 and includes a plant exit slot 70 from which the cotton plants having entered the header 28 will exit.

Figure 3:
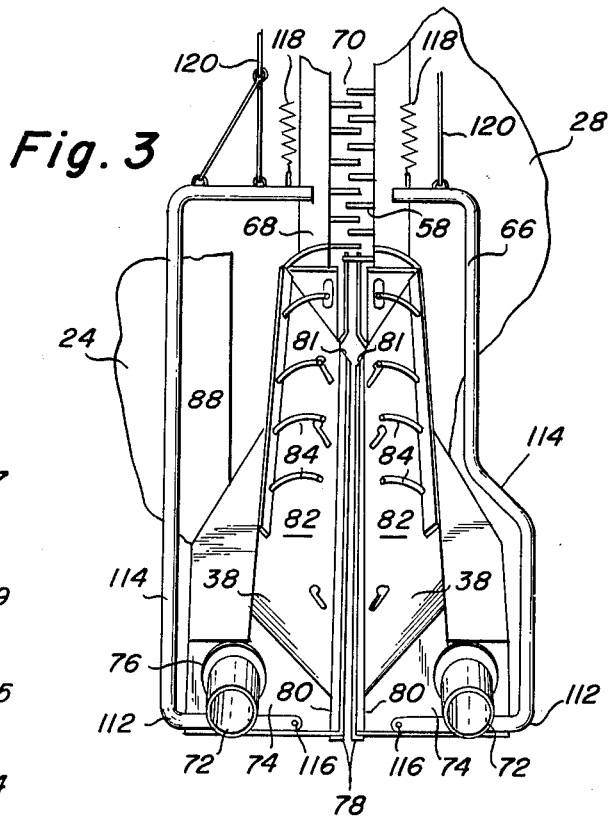
FIG. 3 is a perspective view of the cotton harvesting machine including the cotton gleaner shown in FIG. 1 as viewed from line 3—3.

The cotton gleaner 36 according to this invention is shown in FIG. 3 mounted to the rear surface 68 of the cotton picker header 28 by suspension means 66. The cotton gleaner 36 comprises a pair of intake manifolds 38. The two intake manifolds 38 of the cotton gleaner 36 are situated in a parallel, opposed relationship. As illustrated in FIGS. 2 and 3 each intake manifold 38 comprises generally a floor member 72 having a rearward end wall 74 fixed thereto. The rearward end wall 74 includes an opening 76 through which cotton having been collected by the intake manifolds can be withdrawn. The running edges 78 of the manifolds are in spaced adjacent relationship and tapered on both leading edges 81 such that a cotton plant exiting from the plant exit slot 70 of the picker header 28 must continue between the running edges of the intake manifolds. Rod-like members 84 project into the lower branches of a cotton plant passing therethrough to vibrate and shake the cotton from the plant. Thus, any cotton which has been incompletely dislodged by the picking spindles 58 of the cotton picker header 28 falls from the cotton plant onto the downfall surfaces or sheets 82 of the cotton gleaner 36. The downfall sheets 82 form a generally V-shaped trough, thus directing cotton which has fallen from the cotton plant toward the bottom of the V-shaped trough. A short inside wall 80 having a height significantly less than the tall outside wall 88 is fixed to the floor member 72 parallel to but some distance from the running edge 78. Cotton falling on the downfall sheets 82 is gravitationally directed to that portion of the floor member 72 between the running edge 78 and angle member 82 and the inside wall 80. The angle member 83 assists in preventing the cotton from ever hitting the ground.

As shown most advantageously in FIGS. 2, 4, 5 and 6, the inside wall 80 has a plurality of apertures 92 leading to ducts 93 which are forwardly and upwardly inclined and lead to a flue 90 inside the intake manifolds 38. Cotton having been directed to the bottom of the V-shaped trough is then pneumatically transported through the upwardly and forwardly inclined ducts 93 to the flue 90 and is then withdrawn from the intake manifold through opening 76 in the rearward end wall 74. In front of each aperture 92 is a multi tined fork 91 which acts to separate the desired cotton from green bolls and twigs which may be dislodged from the cotton plants by the rods 84.

The ducts 93 are preferably defined by the downfall sheet 82, a riser floor 95 fixed to the floor member 72 and extending essentially parallel to the downfall sheet 82, and two divergent, spaced-apart riser side walls 96 on each side of the duct 93 extending from the riser floor 95 to the downfall sheet 82. The flue 90 is in a front portion defined by a middle floor member 97 extending from the forward end wall 98 to a step 99 together with the downfall sheet 82 and outside wall 88 as illustrated best in FIG. 6. The flue 90 in a rear portion is defined by the floor member 72, outside wall 88, top member 100, downfall sheet 82, and riser 94 as best illustrated in FIG. 5. The middle floor member 97 is preferably located at a height equal to the inside end of the riser floor 95. The step 99 is believed to act to form a discontinuity in the air velocity through the flue 90 which tends to drop out green bolls of cotton, the green bolls collecting to the rear of step 99 on floor 72. The floor 72 or the outside wall 88 can include a closable opening 108, 110 for eliminating the collected green bolls. The opening 76 is preferably as close to the top member 100 as possible to permit a greater collection of green bolls before elimination is required.

The downfall sheet 82 includes a plurality of longitudinal slots 85 which communicate with the ducts 93. The slots 85 are preferably located on the rearward side of each duct 93, extend over a major lengthwise portion of each duct 93, and have a length about four times the width of the slot.

The intake manifolds 38 of the apparatus includes suspension means 66 for suspending the gleaner immediately behind the header 28. The rear suspension means 112 shown best in FIG. 3 comprises a rod-like member 114 pivotally mounted to the intake manifold by pivot means 116 and to the tractor 22 by springs 118 and guide wires 120. A forward suspension means is fixed to the rear surface 68 of the cotton picker header 28 and hingedly attaches each manifold 38 to the header 28 by means of a rod like member which is adapted to be received into the aperture 132 of the frontward end wall 98 shown in FIGS. 2, 5, and 6. In this manner, the intake manifold 38 is both hingedly and pivotally suspended from the rear surface 68 of the cotton picker header 28 and from the tractor 22.

Although the invention has been described in considerable detail with reference to figures illustrating certain preferred embodiments thereof, it will be understood that variations and modifications can be effected within the spirit and scope of the invention described above and is defined in the appended claims.

I claim:

1. An intake manifold for an apparatus for gleaning cotton comprising:
    a floor member,
    a frontward end wall and a rearward end wall fixed to opposite ends of the floor member,
    an outside wall fixed to an outside edge of the floor member and to the frontward and rearward end walls,
    an inside wall having a height significantly less than the outside wall, the inside wall fixed to the floor member parallel to, but some distance from, a running edge of the floor member, the inside wall having a plurality of apertures, each aperture opening into a forwardly- and upwardly-inclined duct, a downfall sheet fixed to a top edge of the outside wall, the frontward and rearward end walls, and the inside wall so as to be spaced from and inclined with respect to the floor member, the downfall sheet having a plurality of longitudinal slots, each slot being located so as to connect with one of the forwardly-and upwardly-inclined ducts.

2. The intake manifold of claim 1 wherein the outside wall further comprises a closured opening for discharging green cotton bolls collected by the intake manifold.

3. The intake manifold of claim 1 wherein said ducts are defined by the downfall sheet, a riser floor fixed to said floor member parallel to the downfall sheet, and two divergent spaced-apart riser sidewalls extending from the riser floor to the downfall sheet.

4. The intake manifold of claim 1 wherein the longitudinal slots have a width less than the average diameter of a green cotton boll.

5. The intake manifold of claim 1 wherein the longitudinal slots have a length to width ratio of about 4.

6. The intake manifold of claim 1 wherein the floor member further comprises a closured opening for discharging green cotton bolls collected by the intake manifold.

7. An apparatus for use in conjunction with a conventional cotton harvester for gleaning cotton missed by the harvester comprising a pair of parallel, opposed, intake manifolds, each manifold comprising:

a floor member having a front edge, a rear edge, an outside edge, and a running edge, the running edge of each floor member being in spaced adjacent relationship with the running edge of the floor member of the parallel, opposed, intake manifold, a frontward end wall and a rearward end wall fixed to the floor member at the front edge and rear edge respectively, an outside wall fixed to the outside edge of the floor member and to the frontward and rearward end walls, an inside wall having a height significantly less than the outside wall, fixed to the frontward and rearward end walls and fixed to the floor member parallel to, but some distance from, the running edge of the floor member, the inside wall of each manifold having a plurality of apertures, each aperture opening into a forwardly- and upwardly-inclined divergent duct leading to a flue inside the intake manifold, each aperture including forked means to prevent entry of green cotton bolls, and a downfall sheet fixed to the frontward and rearward end walls, the top edge of the outside wall and the inside wall so as to be spaced from and inclined with respect to the floor member, the downfall sheets of the pair of parallel, opposed, intake manifolds thus forming a generally V-shaped trough, the downfall sheet having a plurality of longitudinal slots, one slot communicating with each of the divergent ducts, the slots being each sufficiently narrow to preclude the ingestion of green cotton bolls.

8. The apparatus of claim 7 wherein the flue of each manifold further comprises a middle floor member forming a step-wise discontinuity for trapping ingested green cotton bolls.

9. The apparatus of claim 8 further comprising an opening in each rearward end wall and blower means mounted on the cotton harvester and flexible conduits attached to the openings in the rearward end walls of each manifold and to the blower means for withdrawing cotton collected by the intake manifolds.

10. The apparatus of claim 9 further comprising a conveyor means attached to the blower means for conveying the cotton collected to a cotton picker-header of the cotton harvester.

11. The apparatus of claim 10 wherein the conveyor means further comprises a debris eliminator comprising a longitudinal open framework, mounting means mounting the open framework to the cotton harvester, wire screening fixed to the longitudinal open framework to define a passageway through which cotton can flow, and a plurality of alternate forwardly inclined solid sheets and combs for dispersing clusters of cotton and eliminating debris from the gleaned cotton.

12. An apparatus for use in conjunction with a conventional cotton harvester and a cotton gleaning apparatus for conveying the gleaned cotton from the cotton gleaning apparatus to an intake end of the cotton harvester, the apparatus comprising a blower means connected to the gleaning apparatus for withdrawing the cotton from the cotton gleaning apparatus, the blower means being connected to and introducing the gleaned cotton into a debris eliminator, the eliminator comprising a longitudinal open framework, mounting means mounting the open framework to the cotton harvester, wire screening fixed to the longitudinal open framework to define a passageway through which the gleaned cotton can flow, and a plurality of alternate forwardly inclined solid sheets and combs for dispersing clusters of cotton and aiding in the elimination of the debris.

* * * * *